United States Patent
Johno et al.

(10) Patent No.: US 9,170,523 B2
(45) Date of Patent: Oct. 27, 2015

(54) OPTICAL SCANNING APPARATUS, METHOD FOR PERFORMING THE SAME AND IMAGE FORMING APPARATUS

(71) Applicants: Hiroshi Johno, Kanagawa (JP); Keiichi Serizawa, Kanagawa (JP); Daisuke Yoshida, Kanagawa (JP); Kazunori Watanabe, Tokyo (JP)

(72) Inventors: Hiroshi Johno, Kanagawa (JP); Keiichi Serizawa, Kanagawa (JP); Daisuke Yoshida, Kanagawa (JP); Kazunori Watanabe, Tokyo (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/073,960

(22) Filed: Nov. 7, 2013

(65) Prior Publication Data
US 2014/0146121 A1    May 29, 2014

(30) Foreign Application Priority Data

Nov. 26, 2012  (JP) ................................. 2012-257389
Feb. 25, 2013  (JP) ................................. 2013-035063

(51) Int. Cl.
*B41J 15/14*   (2006.01)
*B41J 27/00*   (2006.01)
(Continued)

(52) U.S. Cl.
CPC ............ *G03G 15/0435* (2013.01); *G03G 15/14* (2013.01); *H04N 1/047* (2013.01); *H04N 1/113* (2013.01)

(58) Field of Classification Search
CPC .............. B41J 2/435; B41J 2/442; B41J 2/45; B41J 2/465; B41J 2/47; B41J 2/471; B41J 2/4753; G03G 2215/0404; G03G 2215/04; G03G 2215/0409

USPC ......... 347/224, 225, 231, 233, 234, 238, 143, 347/248, 259–261, 243, 241, 256
See application file for complete search history.

(56) References Cited

U.S. PATENT DOCUMENTS 6,330,020 B1 * 12/2001 Kamioka ..................... 347/241
7,145,705 B2 * 12/2006 Hayashi ...................... 359/204.1
(Continued)

FOREIGN PATENT DOCUMENTS

CN    101320130 A    12/2008
JP    2004-325949    11/2004
(Continued)

OTHER PUBLICATIONS

Chinese Office Action and English translation thereof dated Aug. 3, 2015.

*Primary Examiner* — Hai C Pham
(74) *Attorney, Agent, or Firm* — Harness, Dickey & Pierce, P.L.C.

(57) ABSTRACT

An optical scanning apparatus for optically scanning at least one scanning target surface, the optical scanning apparatus including: a light source; a light-flux dividing unit disposed on a main optical path of a main light flux emitted from the light source, and the light-flux dividing unit configured to spatially divide the main light flux; an optical deflector disposed on a divided optical path of the divided light flux, and the optical deflector configured to deflect the divided optical path; an optical path opening/closing switch unit disposed on the divided optical path between the light-flux dividing unit and the optical deflector, and the optical path opening/closing switch unit configured to interrupt or pass at least one of the divided optical path; and a controller configured to control operation of interrupting or passing the at least one of the divided optical path by the optical path opening/closing switch unit.

12 Claims, 9 Drawing Sheets

(51) Int. Cl.
*G03G 15/043* (2006.01)
*G03G 15/14* (2006.01)
*H04N 1/047* (2006.01)
*H04N 1/113* (2006.01)

(56) References Cited

U.S. PATENT DOCUMENTS

2008/0297870 A1 12/2008 Kobayashi et al.

2012/0236381 A1* 9/2012 Oikawa ...................... 359/205.1

FOREIGN PATENT DOCUMENTS

| JP | 2004325949 A | * 11/2004 | ............ B41J 2/44 |
|---|---|---|---|
| JP | 2010072634 | 4/2010 | |
| JP | 2011-107466 | 6/2011 | |
| JP | 2012-145667 | 8/2012 | |
| JP | 2012-145749 | 8/2012 | |

* cited by examiner

OPTICAL SCANNING APPARATUS, METHOD FOR PERFORMING THE SAME AND IMAGE FORMING APPARATUS

CROSS-REFERENCE TO RELATED APPLICATIONS

The present application claims priority to and incorporates by reference the entire contents of Japanese Patent Application No. 2012-257389 filed in Japan on Nov. 26, 2012 and Japanese Patent Application No. 2013-035063 filed in Japan on Feb. 25, 2013.

BACKGROUND OF THE INVENTION

1. Field of the Invention

The present invention relates to an optical scanning apparatus, a method for performing the same and an image forming apparatus.

The image forming apparatus according to the present invention performs image formation by an electrophotographic process.

That is, the image forming apparatus according to the present invention can be carried out as an optical printer such as a laser printer, an optical plotter, a digital electronic copier, a plain paper facsimile, and the like.

2. Description of the Related Art

Recently, for an image forming apparatus such as a laser printer, a digital electronic copier, and a plain paper facsimile, colorization of formed images, an increase in the speed, and downsizing of the apparatus have been demanded.

In response to such demands, various image forming apparatuses that use a plurality of photoconductive photoreceptors have been proposed and realized.

As such an image forming apparatus, an apparatus that "shares a light source for optical scanning" with respect to a plurality of photoreceptors has been proposed (Japanese Patent Application Laid-open No. 2012-145667).

As a light source for optical scanning in an image forming apparatus, a "semiconductor light-emitting element" such as a semiconductor laser or a surface-emitting semiconductor laser (so-called "vertical-cavity surface-emitting later (VCSEL)") is generally used.

High-speed drive of these "semiconductor light-emitting elements" has been realized and a signal for modulating exposure energy based on image information becomes a "modulation signal of a higher frequency" from several to several tens of megahertz.

In a semiconductor light-emitting element used for such a "modulation signal of an extremely high frequency", "offset light emission" is always performed for light-emission rise characteristics and stability of light-emitting power.

The offset light emission means to emit light with constant weak light emission intensity during optical scanning, even during a time when light emission does not contribute to image write based on image information.

When a semiconductor light-emitting element as a light source is shared by a plurality of photoreceptors and the "offset light emission" is performed by using the shared semiconductor light-emitting element, there are following problems.

For specific explanation, there is assumed a case where "one semiconductor light-emitting element is shared by two photoreceptors", and an image A is formed on one of the photoreceptors and an image B is formed on the other.

The images A and B are, for example, a cyan image and a black image used for forming a color image.

In this case, when both the images A and B are formed, light emission from the semiconductor light-emitting element is continuously performed, and modulation is performed alternately by a modulation signal for writing the image A and a modulation signal for writing the image B.

When only the image A is formed, the photoreceptor for the image A is optically scanned by "modulated light"; however, the photoreceptor for the image B is optically scanned by "offset light emission".

In this case, when the photoreceptor for the image B is stopped to save energy for driving the photoreceptor, the same spot of the photoreceptor is "optically scanned repeatedly by the offset light emission".

Therefore, light-induced fatigue occurs in a "portion which is optically scanned repeatedly" of the photoreceptor, and the photosensitive property thereof tends to be deteriorated. Such deterioration of the photosensitive property occurs "in a line shape".

When the image B is formed by using the "photoreceptor in which the photosensitive property is deteriorated in the line shape", an abnormal image is formed such that streaky density unevenness appears due to the deterioration of the photosensitive property in the line shape.

Therefore, there is a need to provide an optical scanning apparatus that favorably prevents the abnormal image described above.

SUMMARY OF THE INVENTION

It is an object of the present invention to at least partially solve the problems in the conventional technology.

According to an aspect of the invention, an optical scanning apparatus for optically scanning at least one scanning target surface is provided. The optical scanning apparatus includes: a light source; a light-flux dividing unit disposed on a main optical path of a main light flux emitted from the light source, and the light-flux dividing unit configured to spatially divide the main light flux; an optical deflector disposed on a divided optical path of the divided light flux, and the optical deflector configured to deflect the divided optical path; an optical path opening/closing switch unit disposed on the divided optical path between the light-flux dividing unit and the optical deflector, and the optical path opening/closing switch unit configured to interrupt or pass at least one of the divided optical path; and a controller configured to control operation of interrupting or passing the at least one of the divided optical path by the optical path opening/closing switch unit.

According to another aspect of the invention, an image forming apparatus is provided. The image forming apparatus includes: at least one photoreceptor; an optical scanning apparatus set forth in claim 1 for writing an electrostatic image onto the at least one photoreceptor; and a transferring unit configured to superimpose different color of toner images and transferring the superimposed image onto a common sheet-like recording medium, and fixing the transferred image thereon.

According to further aspect of the invention, a method for performing an optical scanning apparatus for optically scanning at least one scanning target surface is provided. The optical scanning apparatus includes: a light source; a light-flux dividing unit disposed on a main optical path of a main light flux emitted from the light source, and the light-flux dividing unit configured to spatially divide the main light flux; an optical deflector disposed on a divided optical path of the divided light flux, and the optical deflector configured to deflect the divided optical path; an optical path opening/ closing switch unit disposed on the divided optical path between the light-flux dividing unit and the optical deflector, and the optical path opening/closing switch unit configured to interrupt or pass at least one of the divided optical path; and a controller configured to control operation of interrupting or passing the at least one of the divided optical path by the optical path opening/closing switch unit. The method includes: emitting the main light flux from the light source; dividing spatially the main light flux; interrupting the at least one of the divided optical path; and deflecting the divided optical path passing the optical path opening/closing switch unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained below.

Figure 1:
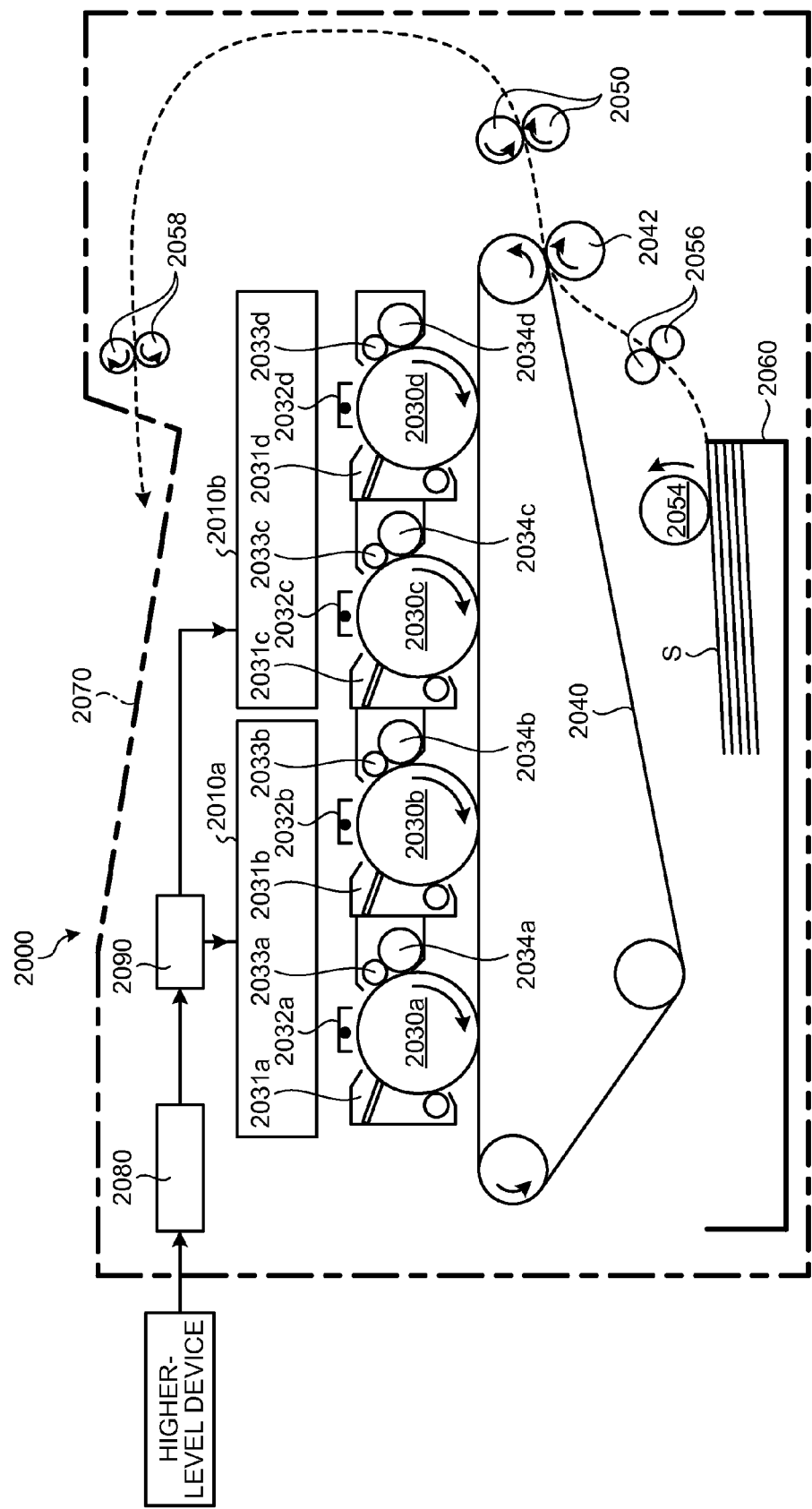
FIG. 1 is an explanatory diagram of an image forming apparatus according to one embodiment of the present invention.

FIG. 1 is an explanatory diagram of an image forming apparatus according to one embodiment of the present invention.

The image forming apparatus is a "tandem color printer".

A color printer denoted by reference sign 2000 is a multi-color printer that forms a full color image by superimposing four color images (black, cyan, magenta, and yellow).

The color printer 2000 includes two optical scanning apparatuses 2010a and 2010b.

The color printer 2000 also includes photosensitive drums 2030a, 2030b, 2030c, and 2030d as four photoreceptors.

A cleaning unit 2031a, a charging device 2032a, a developing roller 2033a, and a toner cartridge 2034a are arranged around the photosensitive drum 2030a.

The photosensitive drum 2030a, the cleaning unit 2031a, the charging device 2032a, the developing roller 2033a, and the toner cartridge 2034a form a "station K".

The "station K" is an image forming station that forms a black image.

A cleaning unit 2031b, a charging device 2032b, a developing roller 2033b, and a toner cartridge 2034b are arranged around the photosensitive drum 2030b.

The photosensitive drum 2030b, the cleaning unit 2031b, the charging device 2032b, the developing roller 2033b, and the toner cartridge 2034b form a "station C".

The "station C" is an image forming station that forms a cyan image.

A cleaning unit 2031c, a charging device 2032c, a developing roller 2033c, and a toner cartridge 2034c are arranged around the photosensitive drum 2030c.

The photosensitive drum 2030c, the cleaning unit 2031c, the charging device 2032c, the developing roller 2033c, and the toner cartridge 2034c form a "station M".

The "station M" is an image forming station that forms a magenta image.

A cleaning unit 2031d, a charging device 2032d, a developing roller 2033d, and a toner cartridge 2034d are arranged around the photosensitive drum 2030d.

The photosensitive drum 2030d, the cleaning unit 2031d, the charging device 2032d, the developing roller 2033d, and the toner cartridge 2034d form a "station Y".

The "station Y" is an image forming station that forms a yellow image.

A transfer belt 2040, a transfer roller pair 2042, and a fixing device 2050 are arranged below these stations K to Y.

A paper feed tray 2060, a paper feed roller 2054, and a timing roller pair 2056 are provided below these stations K to Y.

A paper delivery roller pair 2058 and a paper delivery tray 2070 are arranged in an upper part of the image forming apparatus body.

A communication control device 2080, a printer control device 2090 that executes the overall control of the respective units, and the like are arranged in the upper part of the image forming apparatus body.

The communication control device 2080 controls bidirectional communication with a "higher-level device (for example, a computer)" via a network.

The printer control device 2090 includes a CPU, a ROM, a RAM, an AD converter circuit, and the like.

A program described in a code readable by the CPU, and various data to be used at the time of executing the program are stored in the ROM.

The RAM is a work memory, and the AD converter circuit converts analog data to digital data.

The printer control device 2090 transmits image information from the "higher-level device" to the optical scanning apparatuses 2010a and 2010b.

The printer control device 2090 also executes various controls of optical scanning performed by the optical scanning apparatuses 2010a and 2010b.

Circumferential surfaces of the respective photosensitive drums 2030a to 2030d are respectively formed as a photoconductive photosensitive layer.

Surfaces of the photosensitive layer of the photosensitive drums 2030a to 2030d are "scanning target surfaces" subjected to optical scanning.

When the full color image is formed, the photosensitive drums 2030a to 2030d are respectively rotated clockwise by a drive unit (not shown).

The respective photosensitive drums 2030a to 2030d are uniformly charged by the corresponding charging device 2032a to 2032d.

In this exemplary embodiment, a corona discharge charging device is exemplified. However, the charging device is not limited thereto, and a contact/non-contact charging device such as a charging roller can be used.

Optical scanning is performed to the respective uniformly charged photosensitive drums by the optical scanning apparatus.

That is, the photosensitive drums 2030a and 2030b are optically scanned by the optical scanning apparatus 2010a, and the photosensitive drums 2030c and 2030d are optically scanned by the optical scanning apparatus 2010b.

Optical scanning is performed "between the charging device and the developing roller".

The optical scanning apparatus 2010a performs optical scanning based on the respective pieces of image information of black and cyan supplied from the higher-level device via the printer control device 2090.

The photosensitive drums 2030a and 2030b are optically scanned by the optical scanning.

A "K latent image" corresponding to the black image information is formed on the photosensitive drum 2030a by the optical scanning.

A "C latent image" corresponding to the cyan image information is formed on the photosensitive drum 2030b.

Similarly, the optical scanning apparatus 2010b performs optical scanning based on magenta image information and yellow image information supplied from the higher-level device via the printer control device 2090.

The photosensitive drums 2030c and 2030d are optically scanned by the optical scanning.

With the optical scanning, an "M latent image" corresponding to the magenta image information is formed on the photosensitive drum 2030c, and a "Y latent image" corresponding to the yellow image information is formed on the photosensitive drum 2030d.

The K to Y latent images formed on the corresponding photosensitive drums 2030a to 2030d are developed by the corresponding developing roller 2033a to 2033d, respectively.

That is, the toner cartridge 2034a supplies black toner stored therein to the developing roller 2033a.

The developing roller 2033a visualizes the K latent image formed on the photosensitive drum 2030a by the supplied black toner.

The toner cartridge 2034b supplies cyan toner stored therein to the developing roller 2033b.

The developing roller 2033b visualizes the C latent image formed on the photosensitive drum 2030b by the supplied cyan toner.

The toner cartridge 2034c supplies magenta toner stored therein to the developing roller 2033c.

The developing roller 2033c visualizes the M latent image formed on the photosensitive drum 2030c by the supplied magenta toner.

The toner cartridge 2034d supplies yellow toner stored therein to the developing roller 2033d.

The developing roller 2033d visualizes the Y latent image formed on the photosensitive drum 2030d by the supplied yellow toner.

In this way, a black image, a cyan image, a magenta image, and a yellow image are formed on the photosensitive drums 2030a to 2030d, respectively.

That is, different toner images are formed by an electrophotographic process on the photosensitive drums 2030a to 2030d, which are a plurality of photoconductive photoreceptors, respectively.

The color images of black, cyan, magenta, and yellow formed as described above are sequentially transferred onto the transfer belt 2040 at a predetermined timing.

Transfer of the respective color images onto the transfer belt 2040 can be performed by a known appropriate transfer unit, and the transfer unit is not shown in FIG. 1.

The respective color images to be transferred are superimposed on each other on the transfer belt 2040 to form a "color image".

Transfer of the respective color images from the respective photosensitive drums onto the transfer belt 2040 is referred to as "primary transfer". The color image is transferred to and fixed on a recording sheet, which is a sheet-like recording medium.

That is, a recording sheet S onto which the color image is transferred and fixed is stacked and stored in the paper feed tray 2060, and is delivered and fed one by one by the paper feed roller 2054.

A front end of the fed recording sheet S is nipped between the timing roller pair 2056.

The timing roller pair 2056 delivers the nipped recording sheet S toward a "secondary transfer portion", which is a portion at which the transfer belt 2040 and the transfer roller pair 2042 face each other, at a predetermined timing.

The color image on the transfer belt 2040 is secondarily transferred to the recording sheet S, when the recording sheet S passes through the secondary transfer portion.

The color image transferred to the recording sheet S is fixed thereon by the effects of heat and pressure by the fixing device 2050, and the recording sheet S is delivered onto the paper delivery tray 2070 by the paper delivery roller pair 2058.

The respective cleaning units 2031a to 2031d remove "transfer residual toner" remaining on the surfaces of the corresponding photosensitive drums 2030a to 2030d.

The surfaces of the respective photosensitive drums, from which the transfer residual toner has been removed, return to a position facing the corresponding charging device again.

The optical scanning apparatuses 2010a and 2010b are explained next. Because the optical scanning apparatuses 2010a and 2010b have the same configuration, the optical scanning apparatus 2010a is explained below as an example.

An example of the optical scanning apparatus 2010a is explained with reference to FIGS. 2 to 4.

Figure 2:
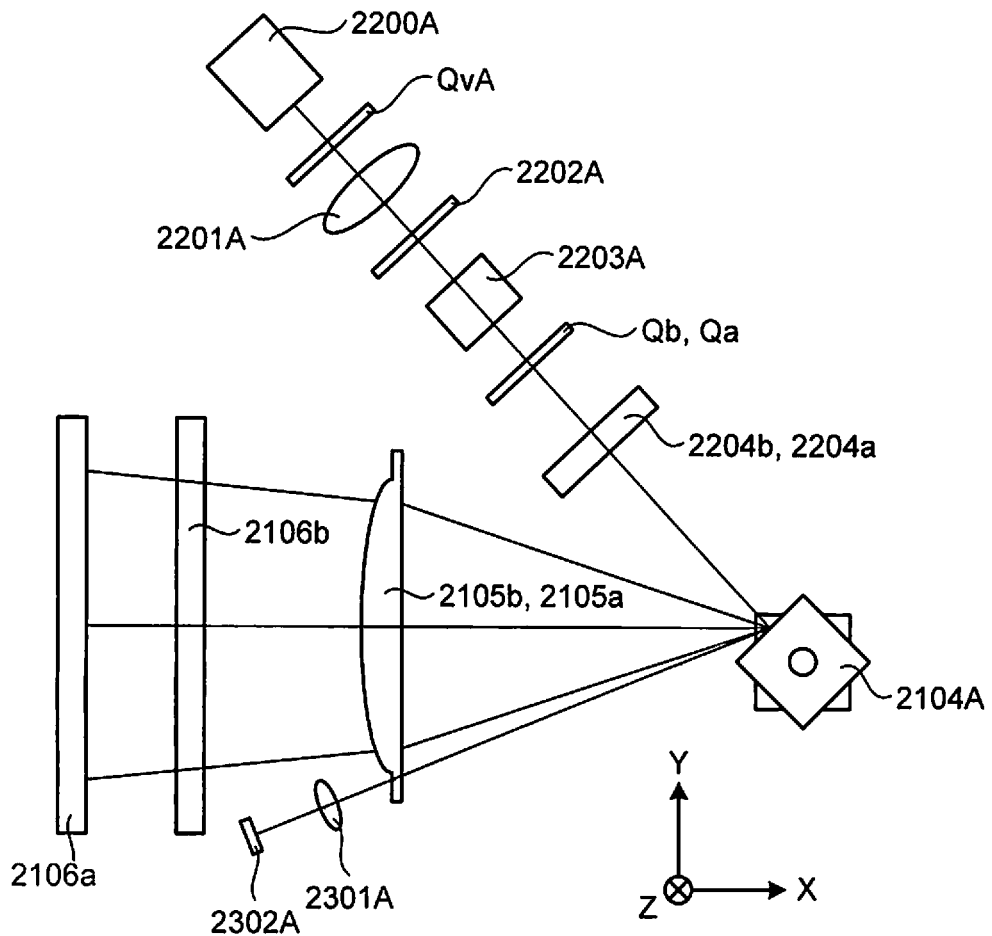
FIG. 2 is an explanatory diagram of an optical scanning apparatus.
Figure 3:
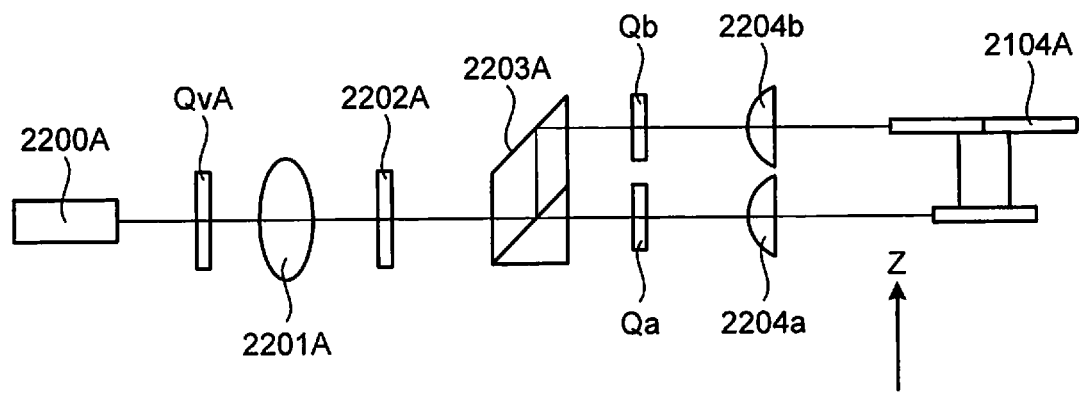
FIG. 3 is another explanatory diagram of the optical scanning apparatus.
Figure 4:
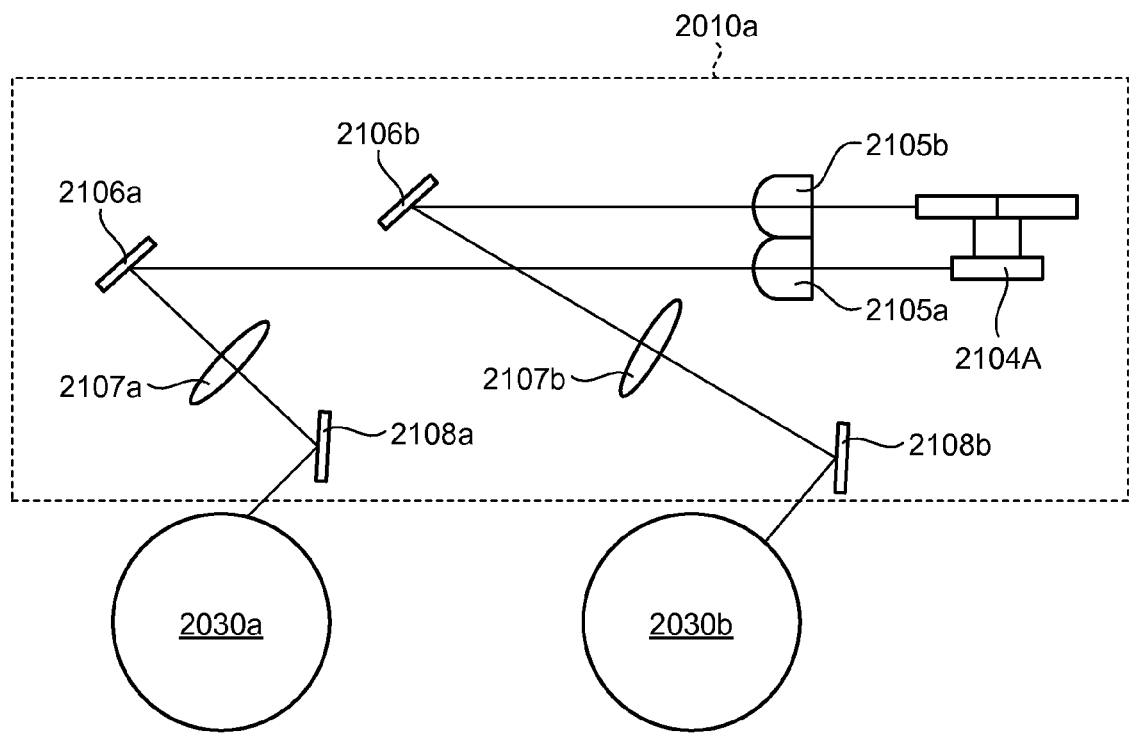
FIG. 4 is still another explanatory diagram of the optical scanning apparatus.

In FIGS. 2 to 4, reference sign 2200A denotes a "single semiconductor light-emitting element" as a light source, reference signs QvA, Qa, and Qb denote a "quarter-wave plate" respectively, and reference sign 2201A denotes a "coupling lens".

Reference sign 2202A denotes an "aperture plate", reference sign 2203A denotes a "light-flux dividing member", which is a light-flux dividing unit, and reference signs 2204a and 2204b denote a "cylindrical lens" respectively.

Reference sign 2104A denotes a "polygon mirror".

Reference signs 2105a and 2105b denote "first scanning lenses", and reference signs 2107a and 2107b denote "second scanning lenses".

Reference signs 2106a, 2106b, 2108a, and 2108b respectively denote an "optical-path bending mirror".

These are arranged in an "optical housing" (not shown) in a predetermined position relation with each other. In FIG. 2 and thereafter, a Z direction is a sub-scanning direction, and a Y direction is a main scanning direction.

The "main scanning direction" is a direction in which the optical scanning apparatuses 2010a and 2010b optically scan the corresponding photosensitive drums (scanning target surfaces).

Furthermore, the "sub-scanning direction" is a direction orthogonal to the main scanning direction on the scanning target surface.

In the following descriptions, directions corresponding to the main scanning direction and the sub-scanning direction are referred to as "main scanning direction" and "sub-scanning direction", respectively, even on an optical axis and an optical path of the light flux extending from the semiconductor light-emitting element 2200A to each of the scanning target surfaces.

In FIG. 2, the semiconductor light-emitting element 2200A is a "semiconductor laser", and emits a linearly polarized light flux (a single light flux) having a predetermined wavelength (in this example, a 780-nm band).

The emitted light flux enters into the quarter-wave plate QvA, and is provided with an "optical phase difference of a quarter-wavelength" and converted to circularly polarized light.

The quarter-wave plate QvA is inclined with respect to a surface orthogonal to a traveling direction of the light flux, and a light flux reflected by the quarter-wave plate QvA decreases an "amount returning to the semiconductor light-emitting element 2200A".

The light flux having passed through the quarter-wave plate QvA is changed to a substantially parallel light flux by the coupling lens 2201A, and is so-called beam-shaped by an opening of the aperture plate 2202A.

The light-flux dividing member 2203A divides the beam-shaped light flux into two light fluxes.

Division of the light flux is explained with reference to FIG. 5.

Figure 5:
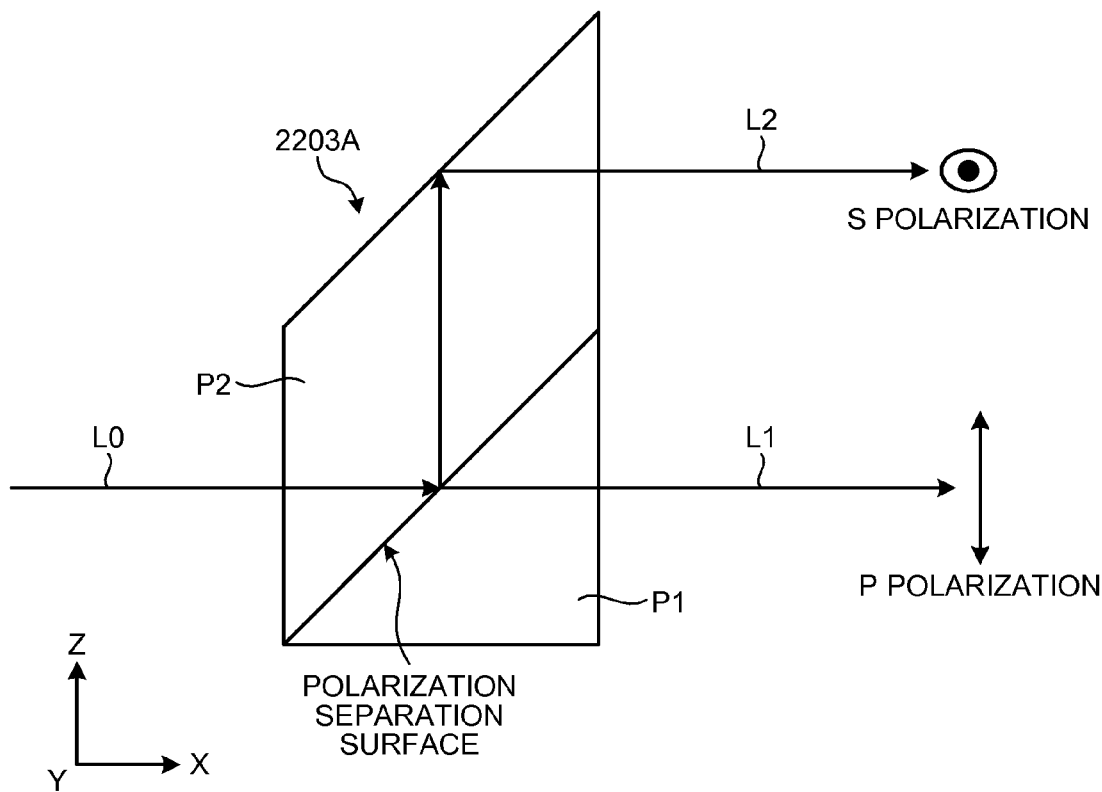
FIG. 5 is an explanatory diagram of division of a light flux.

In FIG. 5, reference sign L0 denotes a light flux entering from the aperture plate 2202A into the light-flux dividing member 2203A. The light flux L0 is "circularly polarized light".

As shown in FIG. 5, the light-flux dividing member 2203A is formed by combining a triangular prism P1 having a sectional shape of right-angled triangle and a square prism P2 having a sectional shape of parallelogram.

A bonded surface of these prisms P1 and P2 forms a "polarization separation surface", which transmits a light flux L1 having a P polarization component of the light flux L0 incident thereto, and reflects a light flux L2 having an S polarization component.

The light flux L1 transmitted through the polarization separation surface "is emitted from the light-flux dividing member 2203A, with a direction of the incident light flux L0 being maintained".

The light flux L2 reflected by the polarization separation surface is reflected by a "reflecting mirror surface" on an upper surface of the square prism P2, "is separated in parallel" from the light flux L1, and is emitted from the light-flux dividing member 2203A.

That is, the light flux L0 from the semiconductor light-emitting element 2200A is divided into two light fluxes L1 and L2 parallel to each other in the sub-scanning direction by the light-flux dividing member 2203A.

In other words, the light flux emitted from the semiconductor light-emitting element 2200A as the light source is spatially divided into plural (two) by the light-flux dividing member 2203A, which is the light-flux dividing unit.

That is, the division number of the light flux by the light-flux dividing member 2203A is two.

Furthermore, the light flux is divided by the light-flux dividing member 2203A by using the polarization property.

As shown in FIG. 3, a first light flux (the light flux L1), which is one of the two light fluxes emitted from the light-flux dividing member 2203A, enters into the quarter-wave plate Qa and is converted to the circularly polarized light.

Similarly, a second light flux (the light flux L2), which is the other of the two light fluxes emitted from the light-flux dividing member 2203A, enters into the quarter-wave plate Qb and is converted to the circularly polarized light.

The light fluxes converted to the circularly polarized light in this manner enter into the cylindrical lens 2204a, 2204b, respectively and are focused in the sub-scanning direction (the Z direction in FIG. 3).

In the polygon mirror 2104A as an "optical deflector", a four-fold mirror having four deflective reflection surfaces is "arranged in two stages in the sub-scanning direction".

As shown in FIGS. 2 to 4, in the four-fold mirror (first polygonal mirror) on the first stage (an upper stage), the light flux (the light flux L2) from the cylindrical lens 2204b enters into the deflective reflection surface and is deflected.

In the four-fold mirror (second polygonal mirror) on the second stage (a lower stage), the light flux (the light flux L1) from the cylindrical lens 2204a is deflected.

The respective light fluxes L1 and L2 are imaged as a "line image long in the main scanning direction" near the deflective reflection surface of the four-fold mirror, to which the light fluxes enter, by the operations of the cylindrical lenses 2204a and 2204b.

In the "two-stage four-fold mirrors" forming the polygon mirror 2104A, normal lines to the deflective reflection surfaces form 45 degrees with each other, and deflection for optical scanning is performed alternately on the first stage and the second stage.

In other words, the four-fold mirrors on the first stage and the second stage respectively "rotate with a phase being shifted by 45 degrees".

The two first scanning lenses 2105a and 2105b shown in FIGS. 2 and 4 respectively have an "fθ function".

That is, the first scanning lenses 2105a and 2105b have a function of equalizing the main scanning speed on the corresponding photosensitive drum surface by the light flux deflected at an equiangular speed with rotation of the polygon mirror 2104A.

As shown in FIG. 4, the first scanning lenses 2105a and 2105b are overlapped in the Z direction (the sub-scanning direction).

The first scanning lens 2105a faces the "lower four-fold mirror", and the first scanning lens 2105b faces the "upper four-fold mirror".

The light flux deflected by the "upper four-fold mirror" of the polygon mirror 2104A is transmitted through the first scanning lens 2105b, and the optical path thereof is bent by the optical-path bending mirror 2106b.

The light flux is then emitted to the photosensitive drum 2030b via the second scanning lens 2107b and the optical-path bending mirror 2108b to form an optical spot.

The optical spot scans the photosensitive drum 2030b in the main scanning direction at the constant speed with the rotation of the polygon mirror 2104A, thereby writing a cyan image.

Furthermore, the light flux deflected by the "lower four-fold mirror" of the polygon mirror 2104A is transmitted through the first scanning lens 2105a, and the optical path thereof is bent by the optical-path bending mirror 2106a.

The light flux is then emitted to the photosensitive drum 2030a via the second scanning lens 2107a and the optical-path bending mirror 2108a to form an optical spot.

The optical spot scans the photosensitive drum 2030a in the main scanning direction at the constant speed with the rotation of the polygon mirror 2104A, thereby writing a black image.

The respective optical-path bending mirrors are provided so that the respective optical path lengths from the polygon mirror 2104A to the respective photosensitive drums match with each other.

The respective optical-path bending mirrors are also provided so that respective "incident positions and incident angles of the light flux to the photosensitive drum" are equivalent to each other.

The cylindrical lenses 2204a and 2204b and the second scanning lenses 2107a and 2107b corresponding thereto form a so-called "optical face tangle error correction system".

That is, the "line image" described above formed by the cylindrical lens 2204a and the scanning direction of the photosensitive drum 2030a have a conjugate relation by the second scanning lens 2107a in the sub-scanning direction.

The "line image" described above formed by the cylindrical lens 2204b and the scanning direction of the photosensitive drum 2030b have also a conjugate relation by the second scanning lens 2107b in the sub-scanning direction.

The first scanning lenses 2105a and 2105b, the second scanning lenses 2107a and 2107b, and the optical-path bending mirrors 2106a, 2106b, 2108a, and 2108b form a scanning optical system.

The configuration described above is a configuration of the optical scanning apparatus 2010a that optically scans the photosensitive drums 2030a and 2030b.

Therefore, the first scanning lens 2105a, the second scanning lens 2107a, and the optical-path bending mirrors 2106a and 2108a form a "scanning optical system of the station K".

Similarly, the first scanning lens 2105b, the second scanning lens 2107b, and the optical-path bending mirrors 2106b and 2108b form a "scanning optical system of the station C".

As described above, the optical scanning apparatus 2010b that optically scans the photosensitive drums 2030c and 2030d have the same configuration as that of the optical scanning apparatus 2010a.

An optical scanning area in the main scanning direction of each photosensitive drum in which image information is written is referred to as "effective scanning area".

In FIG. 2, reference sign 2301A denotes a "synchronization lens", and reference sign 2302A denotes a "synchronization detection sensor".

The synchronization lens 2301A is used for detecting a deflected light flux (the light flux L1) deflected by the "lower-stage four-fold mirror" of the polygon mirror 2104A.

That is, the synchronization lens 2301A is arranged on an optical path of the deflected light flux transmitted through a "non-power portion having no power in the main scanning direction" at an end on a −Y side of the first scanning lens 2105b.

The deflected light flux is focused onto a light-receiving surface of the synchronization detection sensor 2302A.

The synchronization detection sensor 2302A outputs a signal corresponding to an amount of light of the light-received deflected light flux to the printer control device 2090 that controls optical scanning.

The printer control device 2090 determines a "write start timing with respect to the photosensitive drums 2030a and 2030b, based on the signal output from the synchronization detection sensor 2302A.

The synchronization lens 2301A and the synchronization detection sensor 2302A constitute a "synchronization detection system".

The deflected light flux light-received by the synchronization detection sensor 2302A is referred to as "light flux for synchronization detection".

The light flux for synchronization detection passes through the non-power portion of the first scanning lens 2105a, and the optical path of the light flux for synchronization detection does not change regardless of deformation of the first scanning lens due to a change in the ambient temperature.

In this exemplary embodiment, when the two light fluxes L1 and L2 from the semiconductor light-emitting element 2200A scan one of the photosensitive drums, the two light fluxes L1 and L2 do not reach the other photosensitive drum.

When the light flux L1 optically scans the photosensitive drum 2030a, a "light-source drive unit" (not shown) modulates and drives the semiconductor light-emitting element 2200A based on the black image information.

Furthermore, when the light flux L2 optically scans the photosensitive drum 2030b, the light-source drive unit modulates and drives the semiconductor light-emitting element 2200A based on the cyan image information.

Figure 6:
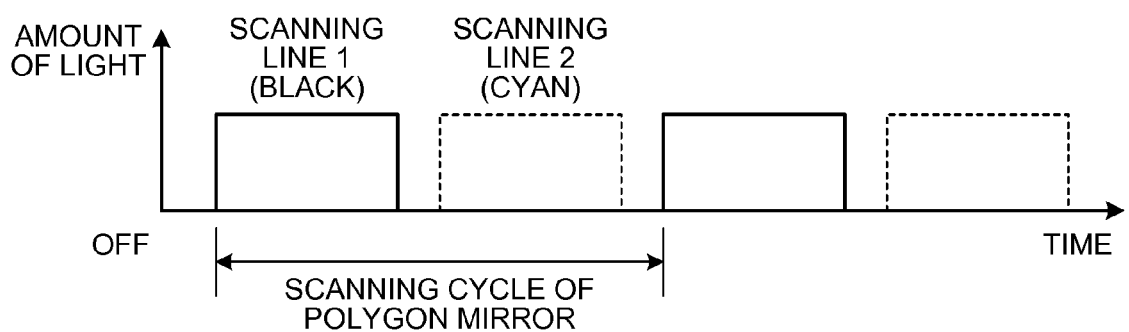
FIG. 6 is an explanatory diagram of optically scanning two scanning target surfaces with light fluxes from one light source.

A time chart for optical scanning with respect to the photosensitive drums 2030a and 2030b in this case is shown in FIG. 6. In FIG. 6, an "amount of light" of exposure is plotted on a vertical axis and "time" is plotted on a horizontal axis.

Exposure by the black image information and the cyan image information is performed by the light flux from the semiconductor light-emitting element 2200A as a common light source.

That is, each of the spatially separated light fluxes L1 and L2 is "spatially separated" and deflected alternately by the polygon mirror 2104A as the optical deflector.

Scanning of the different photoreceptor is performed by each of the deflected light fluxes.

The time chart shows a timing when the light is all turned on in the effective scanning areas of the photosensitive drums.

In FIG. 6, a solid line corresponds to a portion of the black image information, and a broken line corresponds to a portion of the cyan image information.

In FIG. 6, "scanning line 1" means a scanning line by the light flux L1 (a trajectory of the optical spot that performs main scanning), and "scanning line 2" means a scanning line by the light flux L2.

When full-color image formation is performed, optical scanning of the respective photosensitive drums 2030a to 2030d is performed as described above by the optical scanning apparatuses 2010a and 2010b.

The image forming apparatus in FIG. 1 can perform "image formation using only a part" of the four image forming stations.

In this case, image formation is not performed by at least one of the four image forming stations.

As the simplest and most representative case, a case where "a black image is formed as a monochrome image by image formation by only the station K" is explained.

In this case, only the optical scanning apparatus 2010a that is required for forming a black image is operated, and the operation of the optical scanning apparatus 2010b is stopped.

Modulation drive of the semiconductor light-emitting element 2200A that is required for forming a black image is performed after a determination of the write start timing of the black image and the cyan image by the synchronization detection system.

Therefore, until the write start timing is determined, the semiconductor light-emitting element 2200A is forcibly lighted up and deflected, and the light flux for synchronization detection is received by the synchronization detection sensor 2302A.

At this time, because the semiconductor light-emitting element 2200A is forcibly lighted up, optical scanning is performed not only on the synchronization detection sensor 2302A but also on the photosensitive drums 2030a and 2030b.

As described above, offset light emission is performed by the semiconductor light-emitting element for improving rise characteristics and power stability of optical power of the semiconductor light-emitting element 2200A.

Due to the offset light emission, "offset beams" are always emitted, although in a limited amount of light.

After a determination of the write start timing, when the photosensitive drum 2030a is optically scanned, modulation drive of the semiconductor light-emitting element 2200A is performed based on the black image information.

In this case, the photosensitive drum 2030b for forming a cyan image is exposed to the offset beams.

The exposure of the photosensitive drum 2030b to the offset beams causes deterioration of the photosensitive drum 2030b due to light-induced fatigue.

Particularly, at the time of forming the black image, when the rotation of the photosensitive drum 2030b is stopped to reduce power consumption, it becomes a cause of the "abnormal image such as density unevenness" described above.

According to the present invention, this problem is solved by "at least one optical-path opening/closing unit and a control unit".

The at least one optical-path opening/closing unit is arranged in at least one optical path of the light fluxes divided by the light-flux dividing unit to open or close the optical path independently.

The control unit controls opening/closing of the optical path by the at least one optical-path opening/closing unit.

Figure 7A:
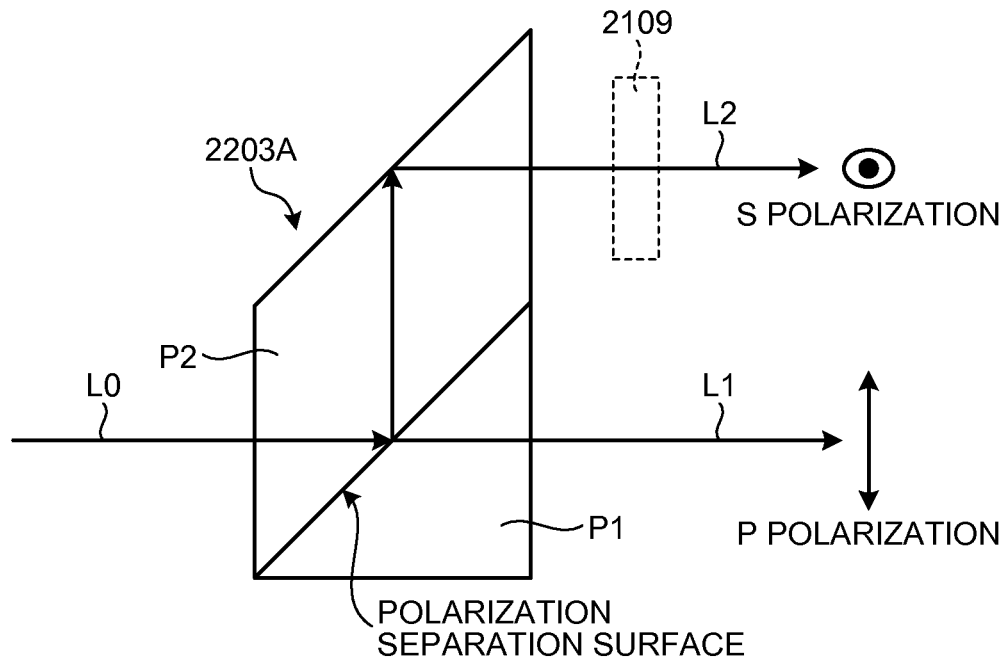
FIGS. 7A and 7B are explanatory diagrams of an example of optical path opening/closing by an optical-path opening/closing unit.
Figure 7B:
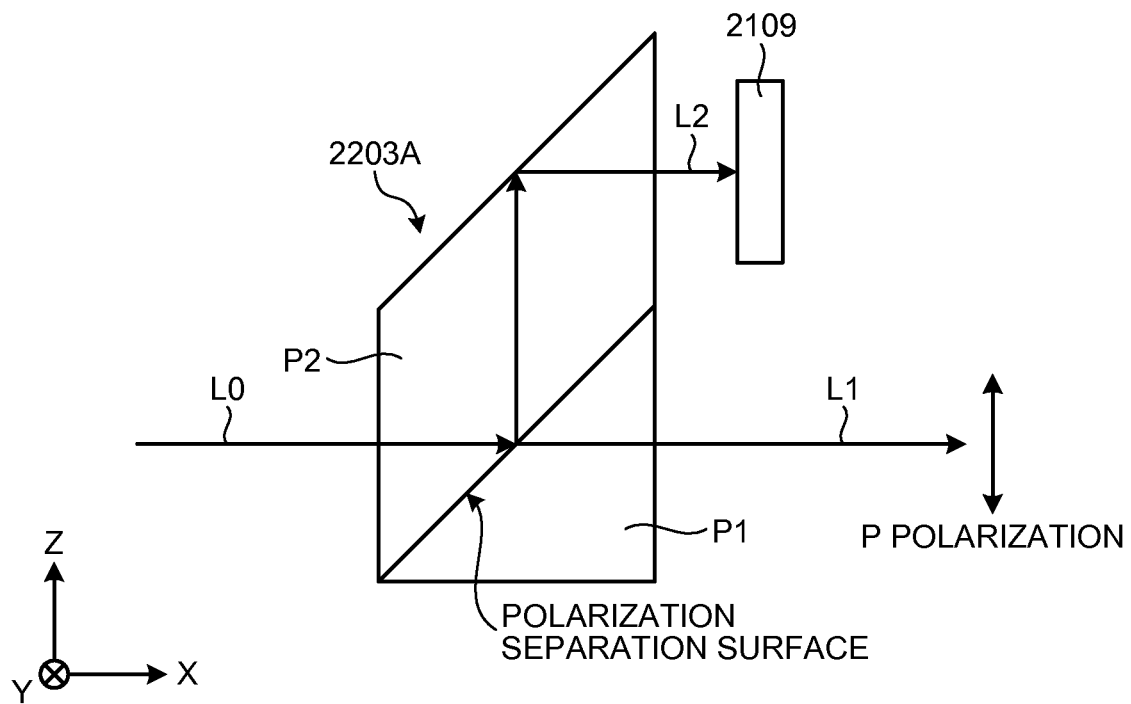

FIGS. 7A and 7B depict one embodiment of the optical-path opening/closing unit.

In the present embodiment, a shielding member 2109 (and a drive unit (not shown)) are provided as the optical-path opening/closing unit between the light-flux dividing member 2203A and the scanning target surface.

The shielding member 2109 is provided to open or close the optical path of one of the divided light fluxes (the light flux L2 that performs write of a cyan image).

That is, the shielding member 2109 shields the light flux L2 guided in the optical path that is opened or closed.

The position where the shielding member 2109 is installed can be basically any position from a position after the light flux from the semiconductor light-emitting element is divided into two by the light-flux dividing unit up to a position of the photosensitive drum surface.

However, a position before the light flux is deflected by the optical deflector is advantageous in view of the installation space and cost, because the size of the shielding member 2109 can be decreased.

In this exemplary embodiment, the shielding member 2109 is arranged on an optical path of the light flux L2 at a position immediately after the light-flux dividing member 2203A.

The shielding member 2109 is driven to move parallel to a Y direction orthogonal to the drawing by a drive unit (not shown, being controlled by the printer control device 2090 in FIG. 1).

Accordingly, the shielding member 2109 and the drive unit (not shown) form the "optical-path opening/closing unit", and the printer control device 2090 forms the "control unit".

The shielding member 2109 can switch the "opened or closed state of the optical path" depending on the input image information.

When the input image information requires all the divided light fluxes for image formation such as full color printing, the "optical paths of both light fluxes are opened" by the shielding member 2109.

This state is shown in FIG. 7A. The shielding member 2109 is retreated from the optical path of the light flux L2, as shown by a broken line, and does not close any optical path.

When the input image information is used to form a monochrome image (forming a black image), only one of the divided light fluxes (the light flux L1) is required, and the other (the light flux L2) is not required.

In this case, the shielding member 2109 is displaced in the Y direction by the drive unit (not shown), so that only the optical path of the light flux L2 is shielded. This state is shown in FIG. 7B.

With this method, the optical path of the light flux L2 is closed by the shielding member 2109. Therefore, the photosensitive drum 2030b is not optically scanned by the light flux L2 (offset beams).

Accordingly, light-induced fatigue of the photosensitive drum 2030b due to unnecessary optical scanning by the offset beams can be suppressed, and an "abnormal image such as density unevenness" can be prevented, thereby enabling to form a high quality image for a long time.

In the present embodiment shown in FIGS. 7A and 7B, the shielding member 2109 moves into and out from the optical path of the light flux L2 with simple parallel displacement to open or close the optical path.

That is, the drive unit that displaces and drives the shielding member 2109 causes the shielding member 2109 to perform simple reciprocating parallel displacement.

As the drive unit that causes the shielding member 2109 to perform simple parallel displacement, a "known appropriate parallel displacement mechanism" can be used, and opening/closing control of the optical path can be executed according to the image to be formed.

Another embodiment of the present invention is explained with reference to FIGS. 8A and 8B.

In the present embodiment, a shielding unit as the optical-path opening/closing unit is provided between the light-flux dividing member 2203A and the scanning target surface.

The shielding unit is provided to open or close the optical path of one of the divided light fluxes (the light flux L2 that performs write of a cyan image).

The shielding unit includes a swingable shielding member 2110 and a drive unit 2111 that drives the shielding member 2110. The drive unit 2111 is a "stepping motor".

Figure 8A:
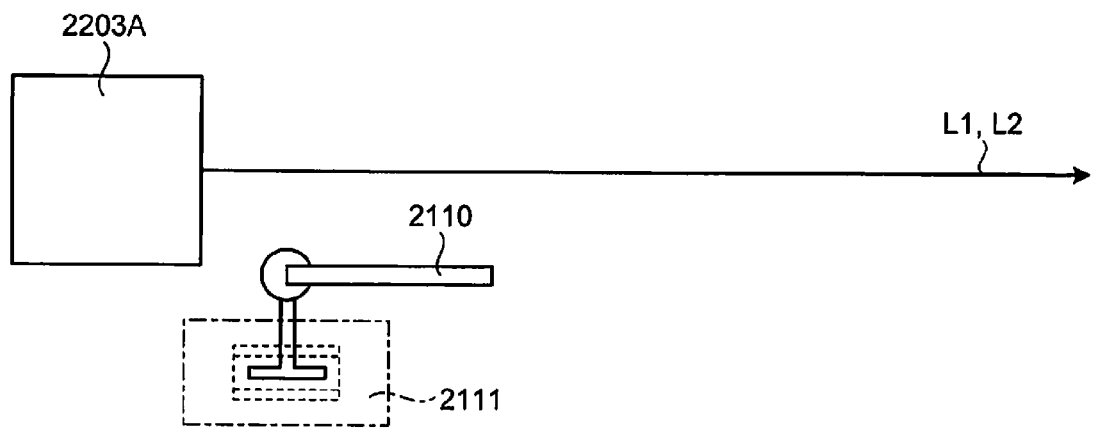
FIGS. 8A and 8B are explanatory diagrams of another example of the optical path opening/closing by the optical-path opening/closing unit.

FIG. 8A depicts a state where the optical paths of both the light fluxes L1 and L2 are opened. FIG. 8B depicts a state where the optical path of the light flux L2 is closed.

The light fluxes L1 and L2 are overlapped on each other in the sub-scanning direction orthogonal to the drawing.

The shielding member 2110 is rotated counterclockwise 90 degrees from the state in FIG. 8A by the stepping motor 2111 and is arranged in the optical path of the light flux L2.

The optical path of the light flux L2 is closed by the arrangement of the shielding member 2110.

Figure 8B:
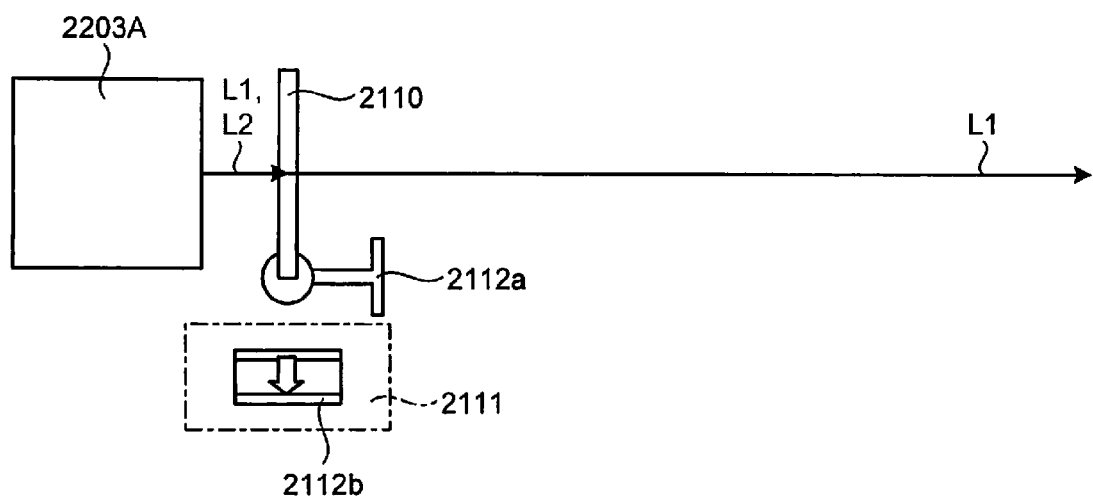

When the shielding member 2110 is rotated clockwise 90 degrees from the state in FIG. 8B, the shielding member 2110 is retreated from the optical path of the light flux L2 to open the optical path of the light flux L2.

The working speed of the shielding member 2110 can be such that an opening/closing operation is complete within a time (within several hundreds of milliseconds) from an input of the image information until synchronization detection light is emitted.

Accordingly, the stepping motor 2111 as the drive unit only needs to be operated while being matched with the time.

The stepping motor 2111 can rotate at a certain angle according to an input signal, and can perform the opening/closing operation without executing any complicated control.

In the embodiment shown in FIGS. 8A and 8B, an optical sensor 2112b and an actuator 2112a are provided. The actuator 2112a is integrally provided with the shielding member 2110.

In the state shown in FIG. 8A where the optical path of the light flux L2 is opened, the actuator 2112a puts the optical sensor 2112b in a shielded state.

As shown in FIG. 8B, when the shielding member 2110 closes the optical path of the light flux L2, the actuator 2112a puts the optical sensor 2112b in an opened state, and the optical sensor 2112b is turned ON.

Accordingly, it is detected that the optical path of the light flux L2 is closed.

By including the actuator 2112a, when the opening/closing state cannot be controlled at the time of a failure or the like of the drive part, this state can be detected, and unnecessary optical scanning by the light flux L2 can be prevented.

By using a black "member emitted with the light flux" such as the shielding members 2109 and 2110 in a piled form, optical absorptance can be increased, and reflection and scattering of the shielded light flux can be suppressed.

Accordingly, adverse effects on the photosensitive drum and the optical sensor and the like installed in the apparatus can be prevented, thereby enabling to form a high quality image.

Three examples of other embodiments are explained with reference to FIGS. 9A and 9B.

Figure 9A:
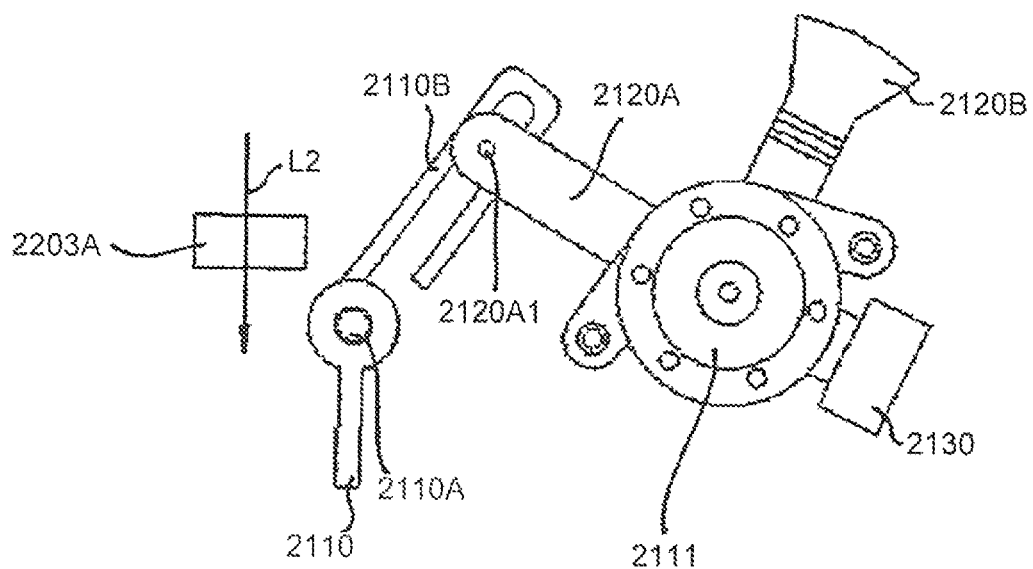
FIGS. 9A and 9B are explanatory diagrams of another example of the optical path opening/closing by the optical-path opening/closing unit.
Figure 9B:
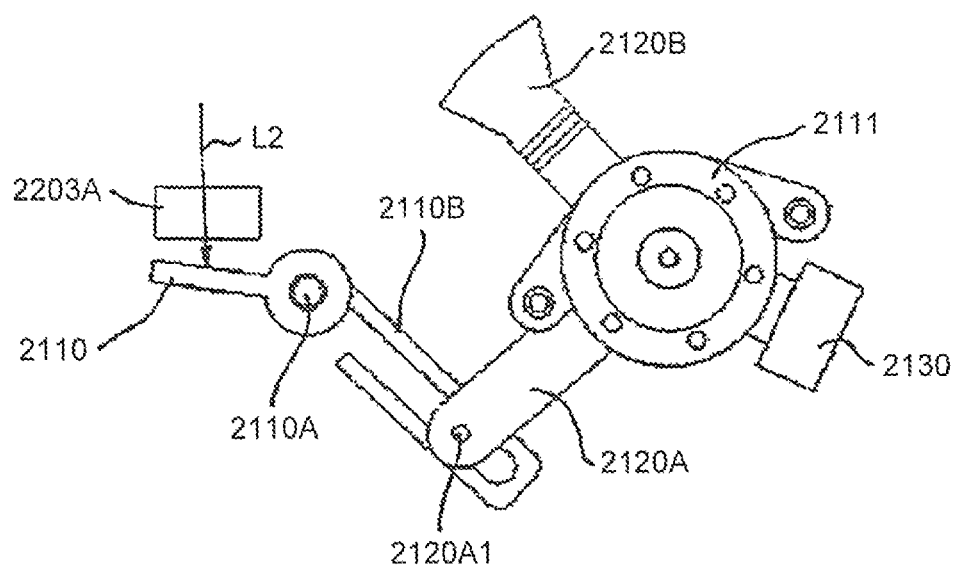

In FIGS. 9A and 9B, reference signs 2203A, 2110, and 2111 respectively denote the light-flux dividing member, the shielding member, and the stepping motor as in FIGS. 8A and 8B.

The shielding member 2110 can rotate in forward and reverse directions, and rotates around a rotation shaft 2110A in the forward and reverse directions to open and close the optical path of the light flux L2. FIG. 9A depicts an opened state, and FIG. 9B depicts a shielded state.

A rotary drive unit 2110B is integrally formed with the shielding member 2110.

The rotary drive unit 2110B is in a "U shape" in this example, and has a gap parallel to a longitudinal direction thereof.

A pin 2120A1 fixed and provided near the end of an arm 2120A of the drive member is inserted into the gap with a backlash.

The drive member includes another arm 2120B integrally formed with the arm 2120A.

The drive member is rotated in the forward and reverse directions around a shaft orthogonal to the drawing of FIGS. 9A and 9B by the stepping motor 2111 as the drive unit.

A rotation shaft of the drive member is coaxial with a drive shaft of the stepping motor 2111.

The arm 2120A of the drive member, the rotary drive unit 2110B, and the pin 2120A1 constitute a link mechanism.

The drive member is rotated counterclockwise a predetermined angle by the stepping motor 2111, from a state shown in FIG. 9A where the optical path of the light flux L2 is opened.

The rotary drive unit 2110B is then rotated clockwise, and as shown in FIG. 9B, the shielding member 2110 closes the optical path of the light flux L2.

Although not shown in FIGS. 9A and 9B, the optical path of the light flux L1 explained with reference to FIGS. 8A and 8B is not opened or closed as in the embodiment shown in FIGS. 8A and 8B.

In FIGS. 9A and 9B, a part denoted by reference sign 2130 is a signal input unit to the stepping motor 2111.

When the drive member is rotated clockwise by the stepping motor 2111, the shielding member 2110 rotates counterclockwise substantially 90 degrees from the state in FIG. 9B to open the optical path.

The working speed of the shielding member 2110 can be such that the opening/closing operation is complete within a time (within several hundreds of milliseconds) from an input of the image information until synchronization detection light is emitted.

Accordingly, the stepping motor 2111 as the drive unit only needs to be operated while being matched with the time. The operation control is also executed by the printer control device 2090 in FIG. 1.

The stepping motor 2111 can rotate at a certain angle according to an input signal, and can perform the opening/closing operation without executing any complicated control.

In the embodiment shown in FIGS. 9A and 9B, the optical-path opening/closing unit constitutes the "link mechanism" as described above, and a displacement amount of the arm 2120A of the drive member and the shielding member 2110 can be set differently from each other.

Accordingly, design flexibility and layout flexibility with respect to the optical-path opening/closing unit can be considerably improved by the drive unit, as compared to a case where the shielding member is directly operated.

As a result, the optical-path opening/closing unit can be installed at a "position having little room for layout" such as in a pre-deflection optical system.

There is a "dead point at which an operation amount of a driven part becomes smaller than that of the drive part" in the link mechanism because of the configuration of the link mechanism.

In the optical path opening/closing operation, it is desired to realize the state in FIG. 9A where the optical path of the light flux L2 is fully opened and the state in FIG. 9B where the optical path is fully closed near the dead point of the link mechanism.

The embodiment shown in FIGS. 9A and 9B realizes this state.

That is, in the state in FIG. 9A where the optical path is fully opened, the longitudinal direction of the gap in the rotary drive unit 2110B is approximately parallel to a "shift direction of the pin 2120A1 due to the rotation of the drive member".

Accordingly, when the drive member is rotated in the state in FIG. 9A, a rotation angle of the shielding member 2110 is smaller than that of the drive member.

Similarly, in the state in FIG. 9B where the optical path is fully closed, the longitudinal direction of the gap in the rotary drive unit 2110B is approximately parallel to the "shift direction of the pin 2120A1 due to the rotation of the drive member".

Accordingly, when the drive member is rotated counterclockwise in the state in FIG. 9B, the rotation angle of the shielding member 2110 is smaller than that of the drive member.

That is, an amount of displacement of the shielding member 2110 by the drive member of the optical path opening/closing member at the time of fully opening/closing the optical path is smaller than that at the time of halfway opening/closing the optical path.

The "fully opening/closing the optical path" means that opening/closing of the optical path is completely performed.

The "halfway opening/closing the optical path" means that opening/closing of the optical path is incomplete.

With this configuration, when the opening/closing state is switched by turning the drive member, even if a target amount of turn varies, fluctuations in the amount of rotation of the shielding member 2110 can be decreased.

Therefore, reliable opening/closing of the optical path of the light flux L2 can be performed.

Figure 10:
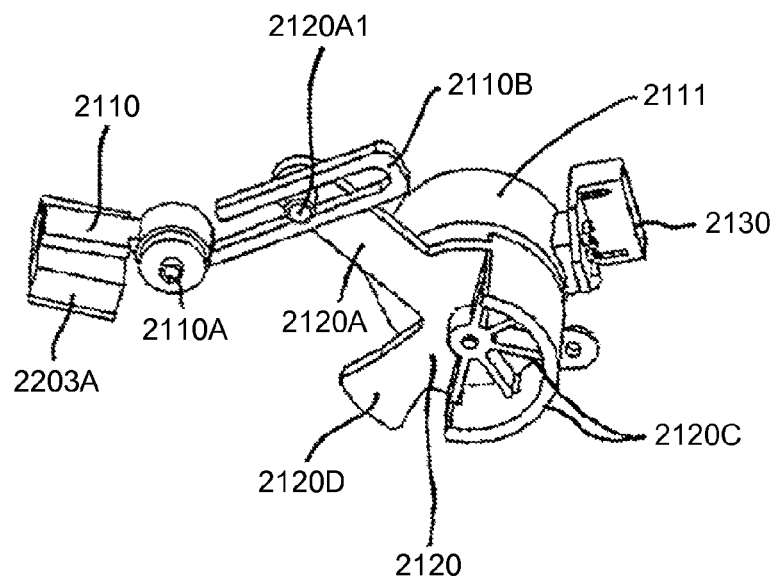
FIG. 10 is an explanatory diagram of still another example of the optical path opening/closing by the optical-path opening/closing unit.

FIG. 10 is an explanatory diagram of another embodiment of the present invention.

In the embodiment explained with reference to FIGS. 9A and 9B, a planar shape of the drive member is not axisymmetric to the rotation shaft of the stepping motor 2111.

In this case, a center of gravity of the drive member is away from the rotation shaft of the stepping motor 2111.

It is assumed here that a moment of inertia specific to the drive member is "I", a distance between the rotation shaft of the stepping motor and the center of gravity of the drive member is "d", and a mass of the drive member is "M".

The moment of inertia associated with the rotation of the drive member by the stepping motor 2111 becomes "$I+Md^2$".

That is, as the distance "d" increases, the moment of inertia increases, and a moment required for rotation of the drive member also increases.

A centrifugal force acting on the drive member at the time of rotation of the drive member also increases with an increase of the distance "d", and counteraction thereof acts on the rotation shaft of the stepping motor 2111.

The embodiment shown in FIG. 10 is an exemplary embodiment considering this point.

FIG. 10 depicts a state as viewed from below the stepping motor 2111. To avoid complexity, like reference signs to those of FIGS. 9A and 9B are added to like parts in FIG. 10, for which any confusion is unlikely to occur.

In FIG. 10, reference sign 2120 denotes a "drive member".

The drive member 2120 includes arms 2120A and 2120D.

The arm 2120D has a different shape from that of the arm 2120B shown in FIGS. 9A and 9B.

As shown in FIG. 10, the drive member 2120 has a "structural portion" denoted by reference sign 2120C.

The structural portion 2120C includes a "half-cut hollow cylindrical portion" and a radial "half-cut wheel shaft portion", and is integrally formed with the drive member 2120.

The structural portion 2120C is a "counter-balanced portion" with respect to the arms 2120A and 2120D.

By providing the structural portion 2120C, the center of gravity of the drive member 2120 can be set near the rotation shaft of the stepping motor 2111, thereby enabling to decrease the distance "d".

Ideally, it is desired to form the structural portion 2120C so as to be "d=0". However, when d is sufficiently small, "d" does not need to be 0.

The moment of inertia "$I+Md^2$" decreases with a decrease of "d", a rotation driving force is reduced, and a centrifugal force acting on the stepping motor as the counteraction also decreases.

Accordingly, rotation of the drive member 2120 can be stabilized and the opening/closing operation of the shielding member 2110 can be also stabilized.

Figure 11A:
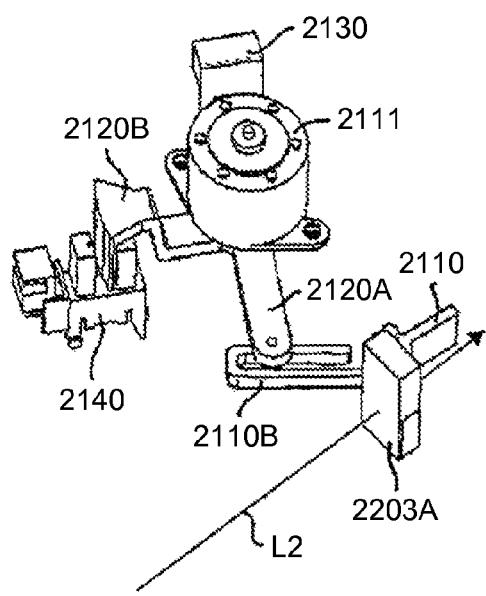
FIGS. 11A and 11B are explanatory diagram of still another example of the optical path opening/closing by the optical-path opening/closing unit.
Figure 11B:
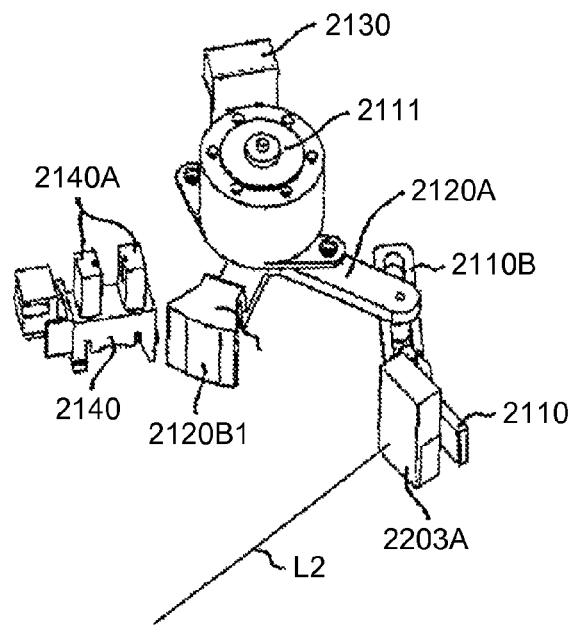

The embodiment shown in FIGS. 11A and 11B is an example in which a detecting unit 2140 that detects the opened/closed state of the optical path by the optical-path opening/closing unit is provided with respect to the embodiment explained with reference to FIGS. 9A and 9B.

As shown in FIG. 11A, the end of the arm 2120B provided in the drive member is bent.

The end of the arm 2120B is bent substantially parallel to the drive shaft of the stepping motor 2111.

The bent portion is a shielding portion 2120B1 with respect to an optical sensor 2140.

That is, the shielding portion 2120B1 shields "between a light emitting part and a light receiving part" of a sensor unit 2140A of the optical sensor 2140 shown in FIG. 11B.

In a state (a state in FIG. 11A) where the shielding member 2110 does not shield the optical path of the light flux L2, the shielding portion 2120B1 is positioned between the light emitting part and the light receiving part of the sensor unit 2140A.

This state is a "Hi" state of the optical sensor 2140.

When the drive member is rotated by the stepping motor 2111 and becomes a state of FIG. 11B, the optical path of the light flux L2 is shielded.

At this time, the shielding portion 2120B1 is retreated from between the light emitting part and the light receiving part of the sensor unit 2140A, and the optical sensor 2140 is in a "Lo" state.

The "Hi" and "Lo" of the optical sensor 2140 are switched in this manner while being associated with the rotation of the drive member by the stepping motor 2111.

According to this configuration, the opened/closed state of the optical path of the light flux L2 can be reliably detected.

With this configuration, when the opened/closed state cannot be controlled at the time of a failure of the drive unit or the like, the state can be detected, thereby enabling to prevent unnecessary optical scanning by the light flux L2.

Even in the embodiments shown in FIGS. 9 to 11, the "member emitted with the light flux" of the shielding member 2110 can be formed in a black piled form to increase optical absorptance, and reflection and scattering of the shielded light flux can be suppressed.

Accordingly, adverse effects on the photosensitive drum and the optical sensor and the like installed in the apparatus can be prevented, thereby enabling to form a high quality image.

The shielding portion can be integrally formed with the shielding member 2110 instead of being provided in the drive member as shown in FIG. 11, so that rotation of the shielding member 2110 can be directly detected.

In this case, the opened/closed state of the optical path can be detected more reliably.

By detecting the opened/closed state of the optical path, occurrence of an abnormal image due to incomplete shielding of the optical path can be prevented, thereby enabling to form a high quality image for a long time.

In the embodiment in FIG. 10, the structural portion 2120C is formed as a "counter balance" in the drive member.

Needless to mention, the structural portion 2120C can be formed in the drive member in the embodiments shown in FIGS. 9 and 11.

The image forming apparatus shown in FIG. 1 has four photoreceptors, and forms a four-color toner image thereon that is required for forming a color image.

The various types of optical scanning apparatuses explained above can be used as the optical scanning apparatuses 2010a and 2010b used in the image forming apparatus.

The present invention is not limited thereto, and any one of the optical scanning apparatuses 2010a and 2010b can be used to carry out an image forming apparatus that forms a two-color image such as red and black.

A case where the "semiconductor laser that emits a single laser beam" is used as a light source has been explained above as an example.

However, the light source is not limited thereto, and a light source "that includes a plurality of light emitting parts and can emit a plurality of light fluxes independently" can be also used.

That is, the light source is not limited to the one described above, and can be an edge-emitting semiconductor laser array or a surface-emitting semiconductor laser (VCSEL).

In such a semiconductor light-emitting element, "a plurality of light fluxes" are emitted from a single element.

In this case, a "light flux emitted from a light source" claimed in claim 1 means an "aggregate of light fluxes" to be emitted.

Accordingly, the light-flux dividing unit divides the light flux into a plurality of light fluxes, in a unit of "aggregate of light fluxes", and the divided "one unit of light flux" includes a plurality of light fluxes.

Therefore, the divided one unit of light flux is focused as "two or more optical spots" on the surface to be optically scanned. "Multi-beam scanning" is performed by these plural spots.

Figure 12A:
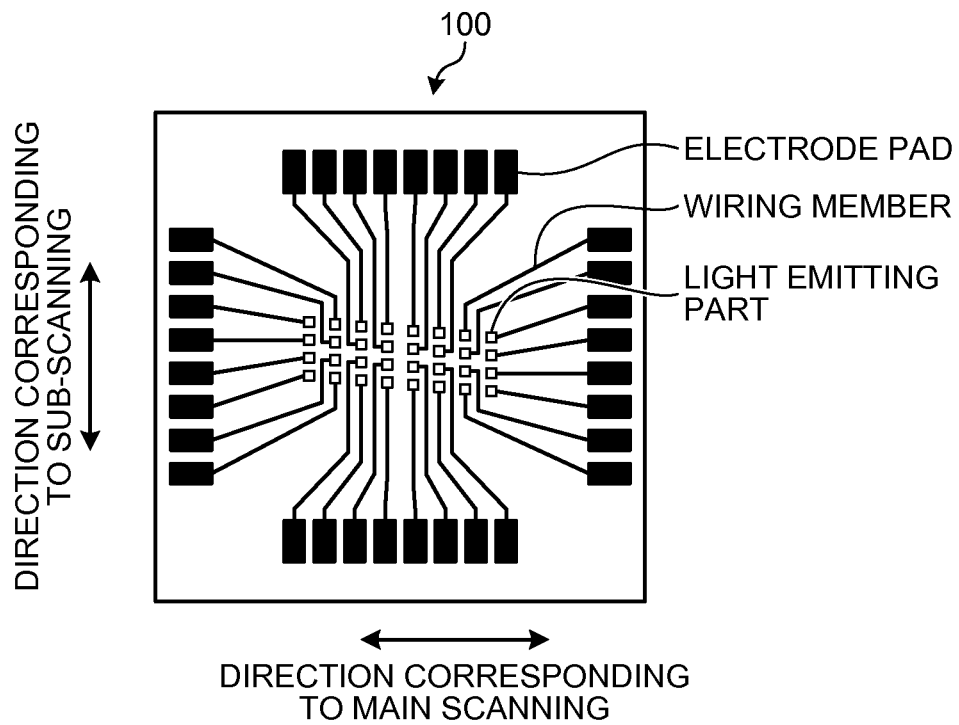
FIGS. 12A and 12B are explanatory diagram of a VCSEL as an example of a semiconductor light-emitting element.
Figure 12B:
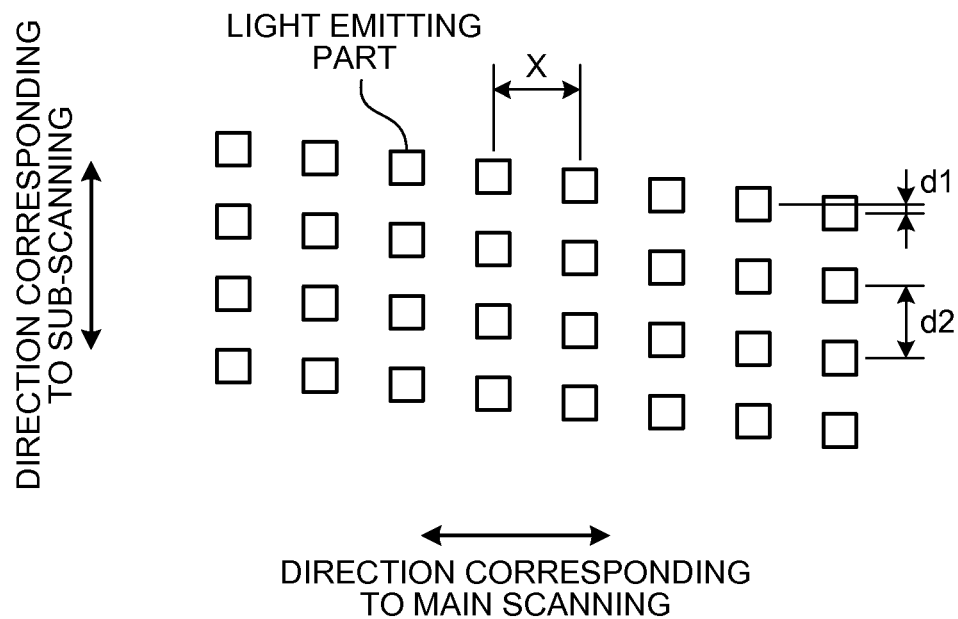

FIGS. 12A and 12B are explanatory diagrams of a "VCSEL" as an example of the semiconductor light-emitting element that emits the light fluxes independently.

As shown in FIG. 12A, a VCSEL 100 includes "32 light emitting parts" two-dimensionally arranged on the same substrate, and electrode pads and wiring members arranged and connected to surround these light emitting parts.

FIG. 12B depicts an arranged state of the light emitting parts.

The 32 light emitting parts are arranged such that adjacent light emitting parts are arranged in the main scanning direction (a direction corresponding to the main scanning in FIG. 12A) with a gap: X.

Furthermore, the light emitting parts are arranged such that adjacent light emitting parts are arranged in the sub-scanning direction (a direction corresponding to the sub-scanning in FIG. 12B) with a gap: d2.

In "one line of the light emitting parts" in the main scanning direction, the adjacent light emitting parts are "displaced" by a distance: d1 in the sub-scanning direction.

This displacement is set so that a projected gap of the light emitting parts becomes an equal gap: d1, when all the light emitting parts are "orthographically projected on a virtual line extending in the sub-scanning direction".

According to the optical scanning apparatus of the present invention, an optical path to a scanning target surface, which does not need to be optically scanned, among a plurality of scanning target surfaces can be closed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning apparatus for optically scanning at least one scanning target surface, the optical scanning apparatus comprising:
   a light source;
   a light-flux dividing unit disposed on a main optical path of a main light flux emitted from the light source, and the light-flux dividing unit configured to spatially divide the main light flux;
   an optical deflector disposed on a divided optical path of the divided light flux, and the optical deflector configured to deflect the divided optical path;
   an optical path opening/closing switch unit disposed on the divided optical path between the light-flux dividing unit and the optical deflector, and the optical path opening/closing switch unit configured to block a portion of the divided optical path, the portion of the divided optical path associated with a polarization of the divided light flux, the optical path opening/closing switch unit including,
      a shielding member configured to interrupt the portion of the divided optical path,
      a rotary unit configured to move the shielding member in a first direction to interrupt the divided optical path, and
      a drive unit configured to rotate the rotary unit in a second direction to interrupt the divided optical path, the first direction and the second direction being different, the drive unit includes an arm connected to the rotary unit by a pin; and
   a controller configured to control operation of interrupting or passing the portion of the divided optical path by the optical path opening/closing switch unit.

2. The optical scanning apparatus set forth in claim 1, wherein
   the light-flux dividing unit is configured to divide the main light flux into a first light flux and a second light flux,
   the optical deflector has a first polygonal mirror and a second polygonal mirror that are configured to rotate in phases shifted from each other, and
   the optical deflector is configured to deflect the first light flux by the first polygonal mirror, and deflect the second light flux by the second polygonal mirror respectively.

3. The optical scanning apparatus set forth in claim 1, wherein
   the light source includes a light-emitting semiconductor device, and
   the light-flux dividing unit is configured to divide the main light flux by using a polarization property of a light flux emitted from the light-emitting semiconductor device.

4. The optical scanning apparatus set forth in claim 1, wherein
   an amount of displacement of the shielding member when the shielding member moves in halfway is smaller than an amount of displacement of the shielding member when the shielding member moves near fully opening or closing position.

5. The optical scanning apparatus set forth in claim 1 further comprising a detecting unit configured to detect an opening/closing state of the divided optical path by the optical-path opening/closing switch unit.

6. The optical scanning apparatus set forth in claim 1, wherein
   the controller is configured to control operation of interrupting/passing of the divided optical path by the optical path opening/closing switch unit according to image information input thereto.

7. The optical scanning apparatus set forth in claim 1, wherein
the light source includes a plurality of light emitting devices, and
each of the light emitting devices is configured to emit a light flux independently.

8. The optical scanning apparatus set forth in claim 1 further comprising a scanning light system configured to focus, onto the scanning target surface as a spot-like pattern, the divided light flux deflected by the optical deflector.

9. An image forming apparatus comprising:
at least one photoreceptor;
an optical scanning apparatus set forth in claim 1 for writing an electrostatic image onto the at least one photoreceptor; and
a transferring unit configured to superimpose different color of toner images and transferring the superimposed image onto a common sheet-like recording medium, and fixing the transferred image thereon.

10. The optical scanning apparatus set forth in claim 1, wherein the first direction and the second direction are opposite directions.

11. The optical scanning apparatus set forth in claim 1, wherein the rotary unit further includes a rotation shaft, the shielding member configured to rotate about the rotation shaft.

12. A method for performing an optical scanning apparatus for optically scanning at least one scanning target surface, the optical scanning apparatus including,
a light source;
a light-flux dividing unit disposed on a main optical path of a main light flux emitted from the light source, and the light-flux dividing unit configured to spatially divide the main light flux;
an optical deflector disposed on a divided optical path of the divided light flux, and the optical deflector configured to deflect the divided optical path;
an optical path opening/closing switch unit disposed on the divided optical path between the light-flux dividing unit and the optical deflector, and the optical path opening/closing switch unit configured to block a portion of the divided optical path, the optical path opening/closing switch unit including,
a shielding member configured to interrupt the portion of the divided optical path,
a rotary unit configured to move the shielding member in a first direction to interrupt the divided optical path, and
a drive unit configured to rotate the rotary unit in a second direction to interrupt the divided optical path, the first direction and the second direction being different, the drive unit includes an arm connected to the rotary unit by a pin; and
a controller configured to control operation of blocking the portion by the optical path opening/closing switch unit,
the method comprising:
emitting the main light flux from the light source;
dividing spatially the main light flux;
interrupting the portion of the divided optical path, the portion of the divided optical path associated with a polarization of the divided light flux; and
deflecting the divided optical path passing through the optical path opening/closing switch unit.

* * * * *